United States Patent [19]
LaRoche et al.

[11] Patent Number: 6,046,740
[45] Date of Patent: Apr. 4, 2000

[54] APPLICATION TESTING WITH VIRTUAL OBJECT RECOGNITION

[75] Inventors: David C. LaRoche, North Hampton, N.H.; Timothy A. Anderson, Sudbury, Mass.

[73] Assignee: Seque Software, Inc., Newton, Mass.

[21] Appl. No.: 09/020,011

[22] Filed: Feb. 6, 1998

Related U.S. Application Data

[60] Provisional application No. 60/037,853, Feb. 7, 1997.

[51] Int. Cl.⁷ ........................................... G06F 3/00
[52] U.S. Cl. .................... 345/339; 345/333; 345/967; 382/203; 714/38
[58] Field of Search ..................... 345/339, 333, 345/335, 346, 356, 967, 433, 441, 443; 382/195, 197, 203, 225, 226; 714/38

[56] References Cited

U.S. PATENT DOCUMENTS

| | | | |
|---|---|---|---|
| 5,018,219 | 5/1991 | Matsuzaki et al. | 382/226 |
| 5,020,112 | 5/1991 | Chou | 382/226 |
| 5,233,611 | 8/1993 | Triantafyllos et al. | 714/46 |
| 5,329,596 | 7/1994 | Sakou et al. | 382/226 |
| 5,379,375 | 1/1995 | Dao et al. | 345/357 |
| 5,596,714 | 1/1997 | Connell | 714/38 |
| 5,781,720 | 7/1998 | Parker et al. | 714/38 |
| 5,787,194 | 7/1998 | Yair | 382/173 |
| 5,886,694 | 3/1999 | Breinberg et al. | 345/340 |

*Primary Examiner*—Raymond J. Bayerl
*Assistant Examiner*—Sy D. Luu
*Attorney, Agent, or Firm*—Darby & Darby

[57] ABSTRACT

A method of recognizing graphical objects by subjecting the graphical information gathered through "spying" to a series of rules by which the object becomes understood or recognized as an instance of a standard logical object. Before the rules are applied, graphical objects are first interpreted as primitives including groups of text, lines and images. In order to recognize a graphical object as a logical object, the graphical information is subjected to the rules in an iterative process whereby an understanding of the object is continually refined. As the rules are applied, the results are evaluated to determine whether the graphical object can be "mapped" to a standard logical object such as a textfield or listbox. Once the object is understood as a logical element with which the user is accustomed, it is possible to interact with the object and obtain data from the object as if it were a standard object with a published interface. By subjecting the graphical data to a series of rules designed specifically to recognize tables, the boundaries and the internal structure of rows and columns will be understood. Once the graphical data is recognized as a table, the data which it contains in rows can then be accessed. By classifying an object as an instance of a known object, assumptions can be made about the object so that it can be navigated or validated by sending events or messages.

55 Claims, 6 Drawing Sheets

```
"ArrayFieldTest" DialogBox                    ⌐300
    "Do It" Button
    "" ComboBox
    "Do It" Button
    "" ComboBox
    "Do It" Button
    "" ComboBox
    "Row:" TextField
    "Column:" TextField
    "Has Column Titles" CheckBox
    "Has Scroll Bar" CheckBox
    "Allows Append" CheckBox
    "Quit" Button
    "" Table
        "Text" Column
            "" ComboBox
            "" ComboBox
            "" ComboBox
            "" ComboBox
        "Number" Column
            "" TextField
            "" TextField
            "" TextField
            "" TextField
        "" ScrollBar
```

FIG. 3

"ArrayFieldTest" DialogBox  ⤴ 300
   "Do It" Button
   "" ComboBox
   "Do It" Button
   "" ComboBox
   "Do It" Button
   "" ComboBox
   "Row:" TextField
   "Column:" TextField
   "Has Column Titles" CheckBox
   "Has Scroll Bar" CheckBox
   "Allows Append" CheckBox
   "Quit" Button
   "" Table
      "Text" Column
         "" ComboBox
         "" ComboBox
         "" ComboBox
         "" ComboBox
      "Number" Column
         "" TextField
         "" TextField
         "" TextField
         "" TextField
   "" ScrollBar ArrayFieldTest" DialogBox (CONTAINER)  
  "Do It" Button  
  "" ComboBox  
  "Do It" Button  
  "" ComboBox  
  "Do It" Button  
  "" ComboBox  
  "Has Column Titles" Button  
  "Has ScrollBar" Button  
  "Allows Append" Button  
  "Quit" Button  
  "" Table (CONTAINER)  
    "" ComboBox  
      "" Edit  
    "" ComboBox  
      "" Edit  
    "" ComboBox  
      "" Edit  
    "" ComboBox  
      "" Edit  
    "" ScrollBar

400

APPLICATION TESTING WITH VIRTUAL OBJECT RECOGNITION

This patent application claims the priority of U.S. provisional patent application Ser. No. 60/037,853, filed Feb. 7, 1997, which is incorporated herein by reference.

FIELD OF THE INVENTION

The present invention generally relates to the field of application software testing. More specifically, the present invention relates to a method of recognizing and classifying graphical objects into logical elements based on their visual characteristics.

BACKGROUND OF THE INVENTION

When applications were first developed for the graphical user interface (GUI) (e.g., Apple Macintosh, Microsoft Windows, UNIX Motif and IBM OS/2 Presentation Manager). application developers used standard GUI objects as building blocks to construct the user interface of the software applications being developed. The standard GUI objects are used to display information to the user and are provided by the GUI vendors. The GUI vendors provide a published interface, including a class, behaviors and properties which allow other programs to send events to objects in order to navigate through the application and to get information from objects to examine application behavior. Examples of standard objects include Checkbox, Listbox, Textfield and Treeview. Essentially, there are a small number of standard controls with a limited number of properties and methods.

GUI applications include some body of executable code which presents data to a user and accepts user responses in the form of keyboard entries or mouse events. Graphical primitives are provided by the GUI operating system and include functions that draw text, lines and images. When the graphical primitives are called, they cause the visual representation of the data that the user actually views. Graphical primitives are called with arguments that specify the desired characteristics of the graphical request. For example, to request that the graphical operating system draw a line, a call is made to the DrawLine primitive function as follows: "DrawLine (hWnd=0B38, Horizontal at (top=341, left=70), size=101). This call results in the drawing of a horizontal line 101 pixels in length starting at the x-y coordinate 341, 70. Similarly, to draw text, a call is made to the graphical primitive DrawText as follows: "DrawText (hWnd=0B38, Rect=(top=320, left=84, bottom=339, right=158), 'Last Trade'). This call results in the display of the string "Last Trade" from the x-y coordinate 320, 84 to the x-y coordinate 339, 158. More complex graphical objects such as listbox, combobox, treeview and table are drawn using these graphical primitive functions.

As more and more applications have been developed for the GUI, and more recently for the World Wide Web, there has been a general trend away from standard objects to custom objects which allow the developer greater control and flexibility, as well as the opportunity to bring richness and novelty to the user interface. The trend away from standard objects is a move from a relatively small number of well defined GUI components to a much larger number of less well defined components. However, there still exists a need to characterize these custom objects so that application software can utilize them. Existing characterization schemes are not well suited to such a task. For example, optical character recognition (OCR) is generally capable of only recognizing, individual character images by matching a pattern of lines and curves to a small set of known characters. Also, screen-scraper technology is limited to recognizing text in a fixed number of rows and columns where color is the only attribute. Neither of these approaches is able to recognize and characterize a large number of graphical objects.

SUMMARY OF THE INVENTION

The present invention provides a method of recognizing graphical objects based on their visual characteristics. Each object is examined through its graphical primitives and then mapped or classified to a class of standard logical objects using a rule-based approach.

By inserting code between a software application and the GUI operating system, it is possible to "spy" on the communications between the application and the GUI operating system, specifically, the graphical primitive function calls and their associated argument lists. It is also possible to query the graphical operating system to obtain the current state of the display device including the current font, font size, font style, background color and other data.

The present invention provides a method of recognizing graphical objects by subjecting the graphical information gathered through "spying" to a series of rules by which the object becomes understood or recognized as an instance of a standard logical object. Before the rules are applied, graphical objects are first interpreted as primitives including groups of text, lines and images. In order to recognize a graphical object as a logical object, the graphical information is subjected to the rules in an iterative process whereby an understanding of the object is continually refined. As the rules are applied, the results are evaluated to determine whether the graphical object can be "mapped" to a standard logical object such as a textfield or listbox. Once the object is understood as a logical element with which the user is accustomed, it is possible to interact with the object and obtain data from the object as if it were a standard object with a published interface. For example, before the rules are applied to an HTML table, the table is viewed simply as a collection of strings and lines. By subjecting the graphical data to a series of rules designed specifically to recognize tables, the boundaries and the internal structure of rows and columns will be understood. Once the graphical data is recognized as a table, the data which it contains in rows can then be accessed. By classifying an object as an instance of a known object, assumptions can be made about the object so that it can be navigated or validated by sending events or messages. For example, text may be extracted from a heading, block of text or textfield.

BRIEF DESCRIPTION OF THE DRAWINGS

FIG. 3 is a listing of a perceived window hierarchy;

DETAILED DESCRIPTION OF THE PREFERRED EMBODIMENTS

Figure 1:
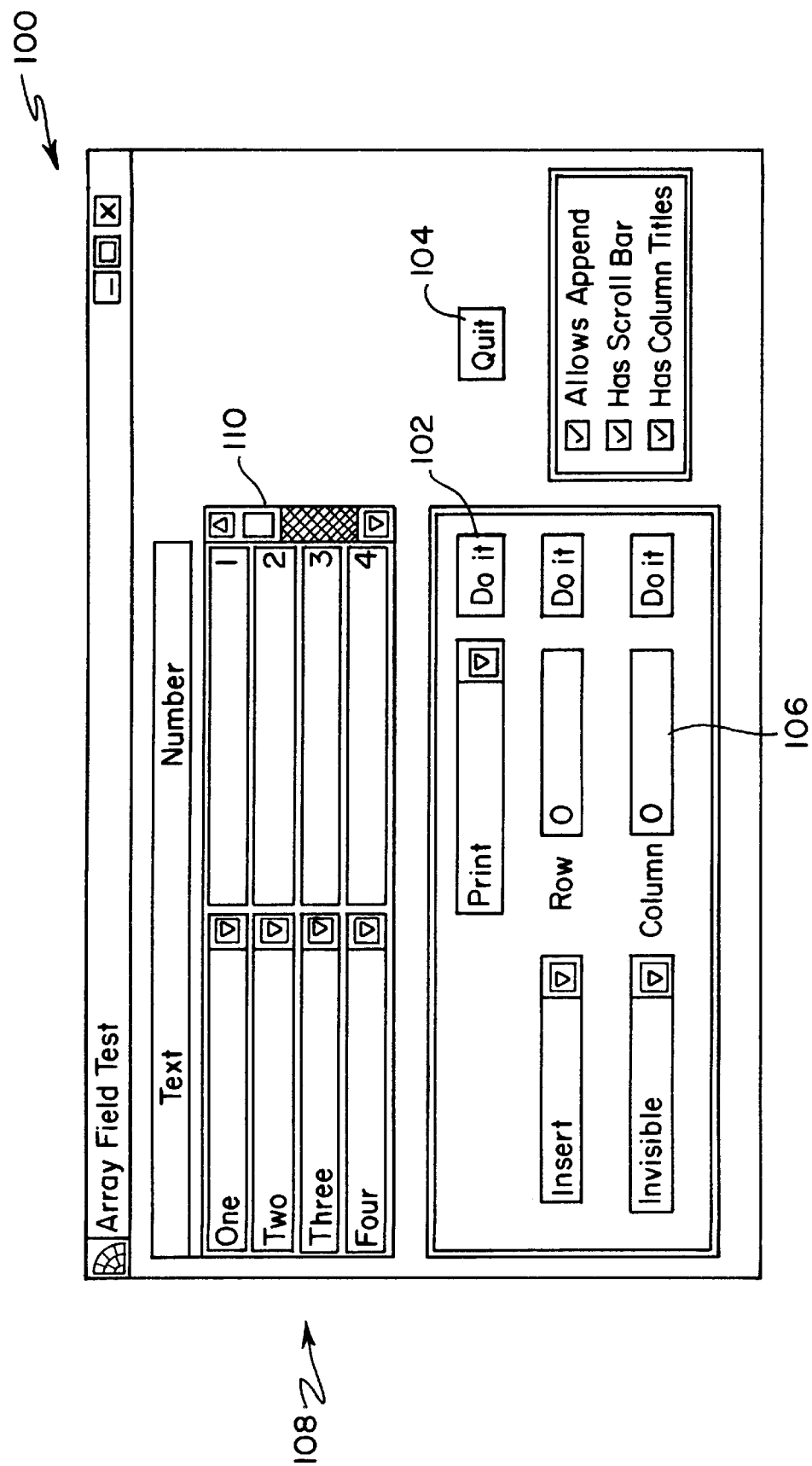
FIG. 1 is an illustration of a sample dialog screen.

The present invention may be used in a software testing application to obtain high-level information about what the application under test ("AUT") is displaying to the user. Many of the specific AUTs the testing application must deal with display logical structures such as text fields and tables to the user without providing an application programming interface ("API") by which testing or other applications can access those structures through software. The general approach in accordance with the present invention is to record what the AUT draws on the screen, map the recorded information to logical structures, and report the logical information back to a client application, such as, for example, a software testing application, on demand. The approach which is taken is formally rule-based, but the preferred implementation describes those rules in a standard programming language for reasons of efficiency. As described below, the rules are parameterized to allow their application in different applications under test.

Use in Windows Applications

Most modern computer systems support the display of information in "windows." Ultimately, most windows are drawn in some way on a display; the mapping from logical window coordinates to physical display coordinates being handled by the operating system in order to isolate the application software from details such as display resolution and the user's arrangement of windows on the display. Windows are generally arranged in a hierarchy, i.e., the contents of a child window will be clipped to fit within its parent, and a child window's position is specified relative to its parent's, so moving the parent on the physical display automatically moves the child. Top-level windows usually represent an application's "frame," which contains all of the documents opened by the user using a particular application. Top-level windows may also be "dialogs," where an application or the operating system obtains specific information from the user (a file name to open, for example), or displays specific results (an error message). Generally, a window is associated with an owning application, which is responsible for displaying its contents (using operating system calls), and for responding to input (typing, mouse clicks, and so on) within the window.

Although it is possible to define a window simply as a rectangle with a particular size and location, modern systems support the idea of window classes and window attributes, which make it easier for applications to associate specific code with specific windows. A top-level application frame window may display a menu bar, where the user makes selections from a limited set of commands, as well as buttons to close the application, enlarge the frame window, or cause the frame window to be displayed as an icon. Each of the buttons can be handled either by drawing within the frame window, or, more easily, by creating child windows that are known to represent buttons. These windows have no need to manage menus or other windows, but need only display something that looks to the user like a button, and respond when the user clicks on them.

Thus, a window's class allows the application to associate a particular behavior, which may be implemented by the operating system, with each window. Windows in addition can have attributes, or "styles," which allow the window's behavior to be modified in particular ways. An application may want its frame window to have a known size, rather than allowing the user to change it, so it will create its frame window (which has a particular class, and thus a particular body of software managing its behavior) with a style that tells the class software to disallow resizing. Other styles may specify whether or not a window should be treated as a child window (i.e., clipped to fit in a specified parent), whether or not the window should accept user input, and so on.

In accordance with the present invention, the window hierarchy managed by a software application is not necessarily the window hierarchy perceived by the application user. One application may create a window to represent a text input field, while another may simply draw a rectangle in a larger window, and accept text input for display within that rectangle. There is essentially no difference in the user's perception of the two applications' behavior. For the user's purposes, or for the purposes of testing, both objects are text fields.

The present invention therefore deals with two classes of windows. First, a "canvas" is a window that contains static objects, such as text and graphics, as well as child windows that accept user input directly, such as the text field mentioned above. Second, a "control" is a window that accepts user input directly, for example, a button, which accepts clicks, a text field which accepts various editing commands as well as simple typing, and so on. The present invention removes the distinction, for its client, between a control that is implemented as a separate identifiable window of a particular class, and a control that is simply drawn on a larger canvas by the application under test. The former is referred to as a "native control", while the latter is referred to as a "rendered control." Some applications will use both forms for a single control, i.e., they will create a native control when a user is actually typing into a text field, but render the control when it is only being displayed. Again, these hybrid controls are not seen as such by the user, and should not be interpreted as such by the client application.

In some cases, applications may create canvases that, in turn, contain other canvases. This allows the application to manage different parts of its top-level window as separate units, without making the unit boundaries visible to the user. This can produce a window hierarchy that is much deeper than the hierarchy visible to the user. Since it is generally desired to parallel what the user perceives, the child canvases are typically ignored and information is stored about any controls they contain (whether native or rendered) relative to the parent canvas. This collapsing of the window hierarchy greatly simplifies the presentation of information to the client application, and improves the ability of the present invention to present what the user sees on the display, rather than the details of the particular techniques used to draw what the user sees.

Referring now to FIG. 1, therein is displayed an application's top-level dialog 100, as seen by the user, The rectangles containing the text "Do It" 102 and "Quit" 104 are push button controls, while those containing numerals are text field controls 106. The group of controls 108 at the top of the dialog, under the "Text" and "Number" labels, is seen by the user as a table. The scroll bar control 110 to the right of the four text field controls allows the user to access other rows of the table, where each row contains a "combo box" control under the "Text" label, and a text field control under the "Number" label.

Figure 2:
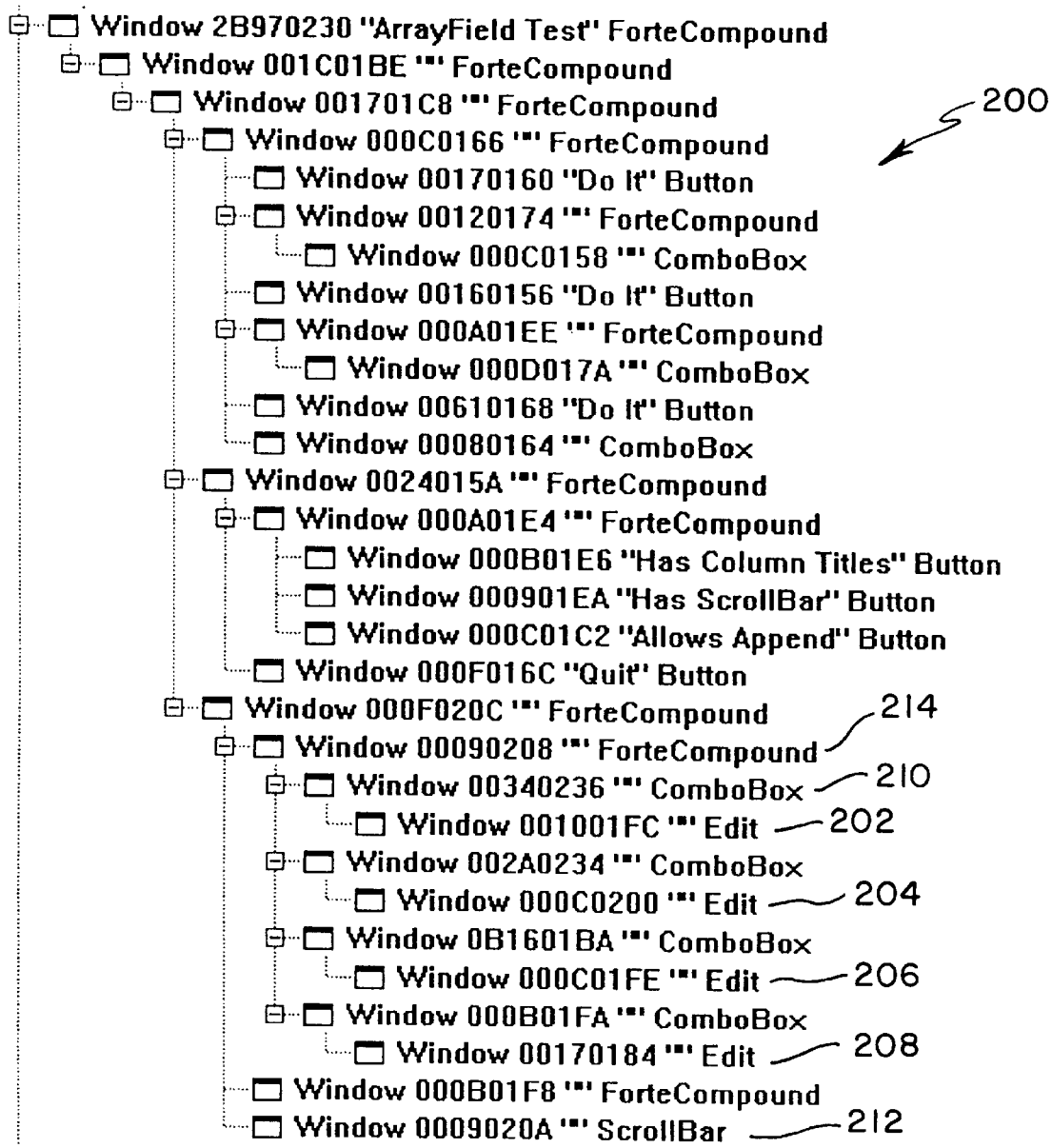
FIG. 2 is a listing of a real window hierarchy.

The window hierarchy associated with this dialog is very different from what the user sees, and is shown in FIG. 2. As shown in FIG. 2, each line of the window hierarchy 200 represents one window, with the level of indentation representing depth in the window hierarchy. On each line, the term "Window" is followed by a number which represents the operating system identifier (e.g., 2B970230) for the particular window, which in turn is followed by the window's caption (e.g., "ArrayField Test"), if it has one, and then finally the window's class, such as "ComboBox," "Edit," or "ForteCompound." For the real window hierarchy 200 shown in FIG. 2, it should be noted that although six text fields have been identified, there are only four windows of the "Edit" class (202, 204, 206, 208), which in the case of Microsoft Windows identifies a standard text field control. Further, each of these "Edit" windows is a child of a "ComboBox" control (e.g., 210), which is already identified as the left column of the table. Thus, any other text field in this dialog is rendered, rather than native.

Additionally, in the window hierarchy 200 there is no window whose class identifies it as being a table, so the table itself must be rendered. The canvas containing the table is identified by observing that there is only one scroll bar window 212 in the hierarchy 200, which is a child of the ForteCompound window 214 whose ID is 000F020C. Not only are the text field controls in the table rendered, they are also descended from a table control that is itself rendered, and has as its children four native combo box controls, four rendered text field controls, and a native scroll bar control.

The perceived window hierarchy 300 corresponding to the real window hierarchy 200, as seen by the user is shown in FIG. 3. As shown in FIG. 3, the ForteCompound canvases are not visible to the user at all, while the table and its contained columns are entirely non-existent as far as the operating system is concerned. The method of the present invention transforms the first hierarchy (the real window hierarchy), in combination with information about what is drawn into it, into the perceived window hierarchy, which allows testing of the application independent of the details of its implementation.

Information Gathering

The specific implementation described herein is specific to Microsoft's Windows 32 system interface, as implemented in the Windows 95 and Windows NT operating systems. However, as is quite clear to the artisans in this field, the same general methods can be used on any of a number of other operating systems, generally by changing the implementation details specific to each system.

On most modern operating systems, each application runs in a "process," which is an operating system construct that gives the application the appearance of running on a computer with nothing else. Effectively, this creates a private address space which other processes cannot access without permission from the system. In accordance with the present invention, a body of code is inserted into the address space of the application under test. The Windows 32 implementation uses standard techniques to "inject" the code for carrying out the present invention into any application's process address space. Other systems might require that the application under test explicitly load the code into its address space, however the present invention itself is not affected by this.

Once present in the application under test, the present invention "hooks" a number of operating system entry points. This means that when the application under test calls, for example, the "DrawText" operating system routine, which paints text into a window, it will actually call the code which implements the present invention (invention code); the invention code will then obtain whatever information it requires, and itself call the actual operating system routine. This allows the application under test to operate without disturbance, albeit somewhat more slowly, while the invention code collects information about what the application has drawn on the display. Any method may be used to hook the operating system calls and need not be specific. Essentially, any entry point that is hooked can in some way be associated with a particular window in the real window hierarchy, i.e., it either accepts a window identifier as a parameter, or returns a window identifier (as, for example, when a new window is created).

When the method of the present invention is running in the application under test, it must maintain a hierarchy roughly parallel to the window system's hierarchy. The exact structure of this hierarchy is determined by parameters specific to the application under test. For example, when the method of the present invention is running in Microsoft Internet Explorer, it will organize windows in a different way from when it is running in an Oracle Forms application. In all cases, however, the rules followed are the same.

When the method of the present invention first begins operation (i.e., when it is first injected), it examines (using standard system calls) all of the windows currently used by the AUT, and constructs a "virtual window hierarchy". Associated with each element in the virtual window hierarchy are: a container window, the set of descendants of the container window for which this element collects information, and all of the information obtained for the container window and the specified set of descendants. Any window which is encountered is classified either as a container window, which will be associated with a new node in the virtual window hierarchy, or as a child window, which will be added to the list of children associated with an existing node in the virtual window hierarchy. When the method of the present invention records a drawing operation in a window that is a descendant of a container window, it will actually record that operation as if it had been performed in the container window, i.e., coordinates will be relative to the origin of the container window rather than relative to the origin of the window in which drawing actually occurred This grouping of many windows into one virtual window hierarchy greatly simplifies the construction of objects described below.

This classification is based on window classes, attributes, and content, as specified in the parameter file. For example, the rules for a Forte application like the one above might specify a rule such as: "a top-level window whose class is ForteCompound is a container; a child window whose class is ForteCompound and whose set of children (as distinguished from descendants) includes a window of class ScrollBar is a container; any other ForteCompound window is a content window." Each of the first two parts of this rule is associated with a virtual window class that will be assigned to the container window. The first rule's virtual class is DialogBox, while the second rule's virtual class is Table. The present invention uses the virtual window class to determine which of its information gathering and grouping rules to apply, with which parameters, to each container window.

Thus, by applying this set of rules, the initial real window hierarchy 400 (FIG. 4) is created. All the ForteCompound windows have disappeared and any operation that applies to them will be recorded in the nearest container window in the virtual window hierarchy.

When the invention code is first installed, it does not have any information about anything that was drawn in any existing window before the installation. Thus, as a first step, once it has constructed a virtual window hierarchy, it forces all windows of the AUT to be redisplayed, using standard operating system calls. This ensures that the virtual window hierarchy is complete, with respect to its content as well as its structure, before the client application can obtain any information. As windows are created and destroyed, the invention code updates the hierarchy to reflect those changes. Two aspects of this implementation are important. First, when a window is destroyed all of its children are implicitly destroyed as well. In the example above (FIGS. 2, 3), when the "ArrayFieldTest" DialogBox is destroyed, the Table container window, and all its children, must also be destroyed. Second, when a window is created, it may be impossible to classify it properly until its children have all been created as well. For example, if the AUT creates a new ForteCompound window which is a child of the "Array-FieldTest" ForteCompound, when the method of the present invention sees the initial operating system call to create the window, it will apply a rule that makes the new window a content window, because it has no children. However, it is generally not possible for the AUT to create any children of the window until later, so this initial characterization may not be accurate. Instead, the window's classification is postponed until the operating system asks the AUT to display the contents of the new window, which generally does not occur until the sub-hierarchy whose parent is the new window has been fully populated. At this point it is possible to determine whether the window has a child of class ScrollBar or not.

A further complication is introduced by the use, in many applications, of "off-screen bitmaps" to reduce the apparent time spent updating the display. For example, if an application is displaying a complicated diagram containing geometric figures whose boundaries must be computed, users will be distracted if they see a pause during the drawing of the diagram, rather than a longer pause before the diagram is drawn at all. Therefore, the AUT may, instead of drawing directly to the displayed window, draw to an off-screen bitmap that is equivalent to the displayed window-it has the same size, the same color scheme, and so on. Once the drawing is complete, the off-screen bitmap can be transferred in one operation, requiring virtually no computation, onto the display. In this way, the user's distraction is minimized, but the display is exactly equivalent. The present invention therefore recognizes the creation of these off-screen bitmaps, and gathers information in them just as if they were container windows. When the AUT copies their contents onto the screen, the present invention copies the contents of the off-screen container window into the corresponding container window in its virtual window hierarchy.

The information gathered by the present invention from the hooked system interfaces may vary depending on general information (contained in the parameter file) about the behavior of the AUT. It may also vary within the AUT, depending on the classification of the container window to which a particular operation applies. The "hooks" used in the present invention maintain a data structure in each window containing the uninterpreted accumulation of all the calls that have happened in the life of the window and its children according to the following procedure.

Object Creation Operations

Figures 4, 5:
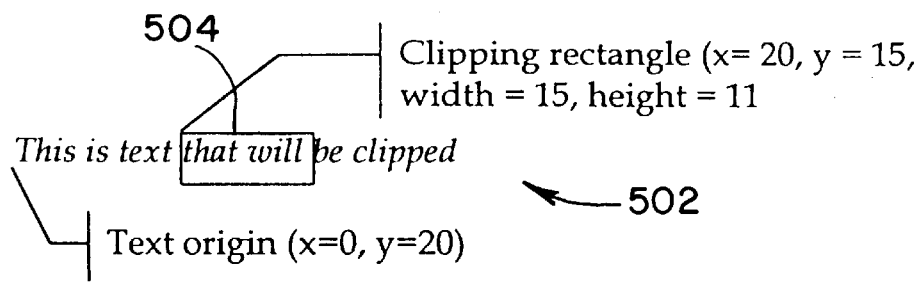
FIG. 4 is a listing of an initial hierarchy.
FIG. 5 is an illustration of text clipping.

Object creation operations, such as text and line drawing operations, cause the invention code to add a new object to the data structure, containing information specific to the type of object created. For a text drawing operation, the present invention will record the actual text, the font used to draw it, the position of the text object created in the container window, its size, and the "clipping rectangle" in effect. The clipping rectangle allows the AUT to draw a text (or other) object such that parts of it are not actually displayed. The AUT allows the operating system to handle the details of deciding where to stop drawing, based on what will fit inside the clipping rectangle. Text clipping is illustrated in FIG. 5. When this text is drawn, the present invention will record the entire string 502, "This is text that will be clipped," which is to be drawn at x=0, y=20, in 11-point Book Antiqua, italicized. It will also record the clipping rectangle 504, allowing it to determine that only the string "that will" actually appears on the display, with the remainder of the text being clipped by the system. For a rectangle or line, the present invention will record the dimensions of the object, its color, and its style-whether it's a solid line, a dotted line, and so on.

Some objects contain other information that the present invention must obtain actively. In a World-Wide Web browser, for example, hyperlinks are represented either by images or by text that is underlined and displayed in a distinctive color, and typically, the client application will want to know the hyperlink target. The present invention obtains this information by moving the mouse cursor over the suspected hyperlink, and extracting text that most Web browsers display in a "status window" to show the user the hyperlink target. The parameter file for these applications specifics that hyperlinks are of interest, and identifies the status window, so text drawn into it can be processed separately. This processing is not performed at the time the AUT draws the hyperlink, rather, the present invention schedules it for a time when the AUT is otherwise idle, to avoid disrupting its normal operation.

Object Destruction Operations

Object destruction operations (which may include object creation operations), cause the present invention to delete objects previously drawn. This can be as simple as a call to the operating system to erase the contents of a window, but it may also include the drawing of a rectangle that is filled with red, in which case, anything that was in the area occupied by the rectangle must be deleted. Window destruction is a more complicated case. When a content window is destroyed, any objects contained in its rectangle will usually be deleted, but some operating systems will allow the creation of "transparent" windows, whose deletion does not have any visible effect on the physical display.

Object Modification Operations

Object modification operations cause the present invention to update information it has already acquired. The AUT may draw a rectangle over some existing text in such a way that the text, rather than displaying as black characters on a white background, will display as white characters on black. In this case, there is no value in breaking the previously-existing text object up into parts. Instead, the present invention records information about the part that has been highlighted along with the text object.

Object Movement Operations

Object movement operations are generally of three types. First, when an off-screen bitmap is copied into a window in the virtual window hierarchy, all of the objects known in the off-screen bitmap are copied into the appropriate container window, just as if they had been drawn in it, and anything previously in the area covered by the copy operation is deleted. In this case, the origins of the objects may be changed during the copy. Second, the AUT may instruct the system to move some portion of the contents of the physical display. In this case, any objects in the portion of the destination rectangle not covered by the source must be deleted, and the objects in the source must have their origins updated. Third, the AUT may move a content window within its parent. This will have the effect either of moving some portion of the physical display, or of clearing the area of the content window.

Scroll Bars

Most operating systems have a notion of "scroll bars", which are controls that allow the user to manage the display of a document that is too large to fit in the window it is being displayed in. When the user "scrolls down," the top part of the document moves out of the displayed area, the bottom part of the displayed area moves to the top, and text from later in the document is drawn in the bottom part. In effect, the window represents a view port on the document and the scroll down operation moves toward the end, or bottom, of the document. For some applications, it is desirable to track the entire contents of the displayed document, rather than only what is on the screen at any given instant. In these cases, the method of the present invention detects the presence of scroll bars in the container window, and, when appropriate (generally, when it needs to return a list of all the controls in the container), causes the container window to scroll in such a way that the entire area of the document in the container window is displayed. As this happens, the method of the present invention is able to update object positions, and thus has a consistent model of the displayed document, in a coordinate space larger than that of the container window.

Many applications on modern operating systems will have several "threads" of execution running in a single process, with all the threads in a process sharing the same memory, but each having its own program counter. It is often left to the operating system to decide which thread will execute at any given time. Because the hooks installed by the method of the present invention apply to all of the threads in a process, and because any thread may draw to a window for which the method of the present invention is gathering data, it is necessary to synchronize access to the data structures managed by the method of the present invention. The operating system provides synchronization facilities, which allow the method of the present invention to block the execution of a particular thread if it requires access to a data structure already in use in another thread.

During information-gathering, the method of the present invention populates a data structure for each container window it has identified. This structure includes all of the descendant windows of the container, and all of the text, simple graphics (lines and rectangles), and images visible in the container window and its descendants, with their locations and attributes. The method of the present invention interprets this data structure only when it must, i.e., when the client application requests information that requires its interpretation. Much of the information gathered will never be reported to the client application, or even interpreted, since interpretation is performed when it is required, not when it is possible.

Object grouping

The method of the present invention receives requests from its client application as messages to a window created by the invention code during injection. When the invention code is injected, it also creates a thread of execution in which the messages to its window are processed. This feature is typically supported by the host operating system and allows the method of the present invention to group algorithms to execute without disturbing any other threads of execution created by the AUT. The information-gathering code, on the other hand, is executed within the AUT's threads, because it runs when one of the AUT's threads draws something on the screen.

This type of architecture requires further synchronization. Specifically, the thread created by the present invention may not perform object grouping unless the AUT is unable to draw to the screen. Otherwise, the data structures that the present invention must use will be changing as it runs. Three steps are taken to ensure proper synchronization and safety. First, on operating systems that support the feature, the thread of the present invention is made "time-critical," meaning that it will not be interrupted to allow the execution of other threads unless it performs an operation that gives up control temporarily. This does not ensure that the method of the present invention will run uninterrupted during object grouping, but it minimizes the disruption of the AUT's execution, because the method of the present invention will execute as fast as possible.

Second, the thread of the present invention obtains a read lock on the data structure for the window whose objects it is currently grouping. If another thread in the AUT is adding information to the data structure, via one of the hooks used by the present invention, the method of the present invention will be forced to wait until the hook surrenders the write lock it obtained. If an AUT thread attempts to draw to the screen once the thread of the invention has a read lock, the hook function for the drawing operation will be forced to wait until the thread of the invention completes execution.

Third, in some cases the method of the present invention provides a mechanism that allows its client application to determine that the AUT is "ready," meaning that it has finished loading and displaying the document of interest. This is particularly important when the AUT is a browser on the World Wide Web, where the document being displayed may take several minutes to obtain from the Internet. The particular procedure used by the present invention to identify the ready state of the browser varies, but the most common technique is to identify in the parameter file for the browser a window where the browser draws an animated icon when it is loading information from the Internet. The hooks of the invention will of course record drawing operations in that window. When enough time has passed without a drawing operation, meaning that the icon is no longer animated, the present invention reports that the browser is ready. By convention, the client application will not request information from the AUT if it is not ready, in cases where this can be determined.

In addition to performing object grouping, the thread of the present invention must respond to requests for information from the client application. Again by convention, the client application notifies the method of the present invention that it is about to make a series of requests for information on a particular container window. Upon receipt of this information, the method of the present invention will perform object grouping on the specified container. As part of object grouping, the present invention copies all relevant object information out of the data structure maintained by the hooks. Thus, information retrieval will proceed based on a consistent snapshot of the state of the container window made at the instant object grouping started. If the AUT changes the contents of the window, the present invention may report slightly out-of-date information. It is the responsibility of the client application to provide notifications at a frequency that will allow the method of the present invention to satisfy its need for accuracy. If the present invention receives a notification from the client, but the contents of the container window are unchanged since the last grouping, operation, no further grouping will be performed.

The object grouping algorithms used in the present invention consist of a set of parameterized rules and groups of rules, applied sequentially to the object information gathered by the hooks and the result of whatever grouping rules have already been applied. The order in which the rules are applied is important, and the application of any particular rule may be prevented by settings in the parameter file for the AUT. In any rule that involves the comparison of object positions, there will generally be a tolerance parameter. Although for the sake of simplicity this tolerance parameter is omitted from the rule descriptions below, it should be understood that a tolerance may be used in the comparison of object positions. For example, if the description says, "a horizontal line whose left end matches the top of the vertical line already found," this is interpreted to mean that the two positions are the same within some tolerance, for example, two pixels in each dimension.

The output of the grouping process is a set of "virtual objects" which represent rendered controls, such as text fields, and composites, such as tables, made up of a group of rendered and perhaps native controls. A virtual object is the basic unit that can be manipulated by the client application. The client can examine properties of the virtual object, such as its size, position, and content, and it can also simulate user actions, such as typing and mouse clicks, on the virtual object. Grouping generally involves merging primitive objects such as lines and text strings into composite objects, such as rectangles and text fields. When two objects are merged, the rectangle associated with the result is the smallest rectangle that contains both of the objects. Additionally, the type of the result depends on the rule applied. When two text objects are merged, the result is a text object. In contrast, when a rectangle and a text object are merged into a text field, the result is a new type of object, that could not have been created during the information gathering phase.

The basic rules in the order in which they are generally applied, is as follows. It should of course be understood that depending on the particular application, only a subset of these rules, may be applied, and/or the rules may be applied in a different order.

1. Rectangles are created from lines. Only vertical and horizontal lines are considered in the embodiment described herein, because AUTs generally do not use rotated rectangles to communicate with the user. However, the principles of the present invention are equally applicable to applications which are not so limited to vertical and horizontal lines. In creating or recognizing rectangles, all lines are obtained from the initial database and are sorted by vertical position. First, a vertical line is found, then a horizontal line is found whose left end matches the top of the vertical line, then another vertical line is found whose top matches the right end of the horizontal line, and whose bottom matches the bottom of the first line found. Finally, an attempt is made to find a horizontal line which extends from the bottom of the left vertical line to the bottom of the right vertical line.

Figure 6:
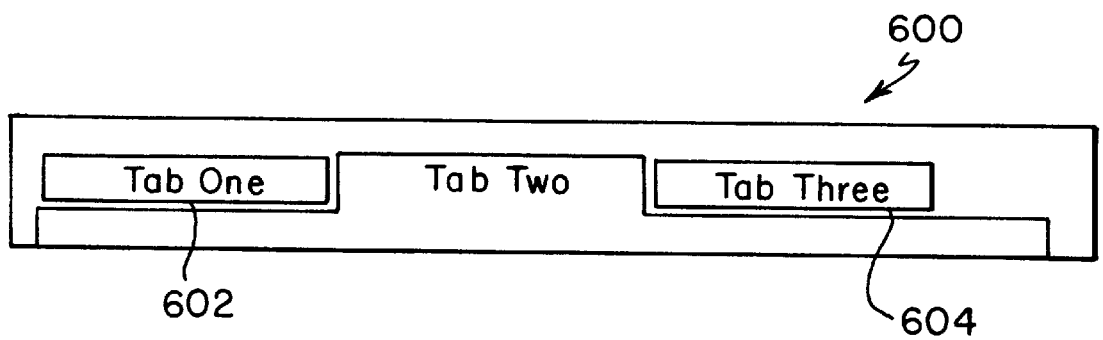
FIG. 6 is an illustration of a page list.

If the bottom line is missing, the three-sided structure is added to a data structure that may later be used to construct a virtual "page list," a control that simulates file folder tabs, as shown in FIG. 6. It should be noted that in Page list 600, the lines 602 and 604 under "Tab One" and "Tab Three" do not line up on the edges. Therefore, these potential tabs will be recognized as such. Exact alignment of the lines may prevent the present invention from recognizing this as a page list, but it also could confuse a human viewer of the control, and is therefore uncommon. Otherwise, the method of the present invention constructs the smallest possible rectangle from the lines contained within the rectangle originally found. Many applications create three-dimensional effects by drawing, parallel lines in different shades of gray. Rather than creating several nested rectangles, a single rectangle is created, recognizing that anything it contains must fit within the innermost nested rectangle. Finally, the colors of the lines making up the rectangle are used to assign a raised or lowered attribute to the rectangle as a whole. On Microsoft Windows, there is a convention that three-dimensional controls are illuminated from the top-left corner of the screen. Therefore, a "raised" control will have lighter lines on the top and left, and darker lines on the bottom and right. This information will be subsequently used to determine whether a rendered button control is in the "pressed" or lowered state.

At this point, the present invention has assembled a list of rectangles constructed from individual lines, and a list of rectangles drawn using operating system primitives that construct a rectangle in one call. The two lists are merged, and a notation is made for any containment relationships that can be established, e.g., a "real" rectangle that contains constructed rectangles, or a constructed rectangle that contains real rectangles. This information may be used in connection with the application of other rules.

2. Adjacent images are merged into single objects. Specifically, two images (i.e., bitmaps) will be merged if their top and bottom edges are the same, and the right edge of one matches the left edge of another. Such images are indistinguishable to the user (their existence is often an artifact of the way the AUT draws large images), and therefore need not be distinguished by the client. An exception to this rule is made if the AUT is a World-Wide Web browser, and if the images represent hyperlinks to different locations, because in that case they can be distinguished by the user.

"Stacked" images are merged in the same way, Stacked images have matching left and right edges, and the bottom of one matches the top of the other. Finally, very small images are eliminated from further consideration. This is because they usually do not convey any information to the user that is not available in some other, more accessible form. This reduces the time spent grouping without degrading the information made available to the client.

3. Most native controls provide a way for the AUT to attach label text automatically, as part of the control. However, in some cases a particular application will choose to draw the label itself. In such a situation, the present invention will initially see this as two distinct objects. For "check box" and "radio button" controls, an attempt is made to associate label text by looking for text objects to the right (but not too far to the right) of the control, whose vertical center is aligned with the control's vertical center, and that is not separated from the control by a vertical line. Text that has been associated with a control in this way becomes a part of the control object. Subsequent rules that operate on text objects will not see the control labels.

4. Text objects are then merged according to several rules. When two text objects are merged, the result is still a text object, and therefore, a single piece of text may be affected by the application of more than one of these rules.

4.1 First, list numbers (a text object that begins with either a string of digits or a single letter, followed by a period) and bullets (a text object consisting of a single bullet (• or 'o')) are merged with any text to the right that is close enough, center-aligned, and not separated by a line from the number or bullet.

4.2 Second, text that overlaps vertically is merged, i.e., two text objects that are approximately on the same line will be merged into a single text object.

4.3 Stacked text (i.e., the bottom of one text object is very near the top of the next) is then merged if it is either left-aligned, right-aligned, or center aligned, unless one of the following exceptions is met: (a) if there is a line between the objects, (b) if both objects end with a colon, or (c) if one object is in bold face and the other is not. These restrictions tend to group the text logically because if one object is bold and the next is not, generally the bold text is a header, and the normal text is body text. Also, if both objects end with colons, then they are probably labels for controls that have not yet been constructed.

4.4 List objects, as grouped by the first text rule, are joined if they are close enough and if there is no line between them, regardless of colons and typeface.

4.5 Finally, text objects ending with colons are merged with text that is below them, not too far away, and left-aligned with the "label" object.

These rules attempt to group text logically, regardless of how the AUT might have painted it. Several left-aligned text lines will be grouped into a larger object corresponding to a paragraph. A gap which one typically finds between paragraphs, will cause a new text group to start. In no case, however, is information lost. Although it may not be grouped exactly as the text author intended, it will nevertheless be grouped in a way that matches quite closely the way a human would parse it.

5. Once all the text has been merged, text objects that were identified as list elements (starting with a number or a bullet) are grouped into lists. Again, this proceeds vertically and the grouping ends when a non-list object is found, when a horizontal line is found, or when a list object is found that begins to the left of the first list object in the group. In the last case, that list object will be used to begin a new list. Thus, the following grouping:

A. List A
1. List 1
2. List 2 will become a single list object, while the following grouping:

1. List 1
2. List 2
A. List A
B. List B will become two separate list objects.

The next three rules are used to identify rendered controls.

6. It will be recalled that bottomless rectangles were saved during rectangle grouping for the construction of page lists. These potential tabs are sorted first by the vertical position of their bottom (missing) edges, then left to right. If two tabs or more tabs are found that are bottom aligned, sufficiently close together horizontally, and suitably labeled (a single text object, or two overlapping text objects used to produce a three-dimensional effect), a page list control will be constructed. All the objects used to construct the page list control will be removed from further consideration by the subsequent application of additional rules.

7. Rendered push buttons and rendered text fields are actually quite similar. Their recognition depends on the construction of a parameter file for the AUT that reflects the design of the AUT's user interface. In both cases, the control is a rectangle with specific properties. For push buttons, constructed rectangles that contain other rectangles are ruled out. Real rectangles typically have more information available, because the operating system primitives that draw them allow more options, e.g., they can be filled with a specific color, or have three-dimensional effects on the edges indicating either that the interior of the rectangle is raised or lowered, or that the line around the rectangle is raised or lowered. Thus, for a particular application, it may be observed that push buttons are drawn as rectangles filled with a particular shade of gray, with a particular border color. Some combination of these tests is applied, depending on the AUT. At the same time, an attempt is made to determine whether the push button (if the rectangle under examination is a push button) is pressed or not, by examining flags passed when the rectangle was drawn (if it is a real rectangle), or flags generated by the present invention's rectangle construction code. Generally, a button is considered to be pressed if the top and left edges of the rectangle are darker than the bottom and right edges. Depending on the AUT, the push button will be accepted if it meets these criteria, and is suitably labeled, i.e., if the push button contains a single image (some applications allow push buttons labeled with images), a single text object, or, in some cases, nothing at all. For some applications, the label's color is also of interest because a black label may indicate that the push button is enabled, while a gray label may indicate that it is disabled. The enabled/disabled state, and the pressed/released state, are readily available from the operating system for real push buttons. It is therefore valuable to make the same information available for rendered push buttons, so that the client application need not deal with any differences between the two forms.

7.1 Rendered text fields are much like push buttons. Frequently, the only recognizable difference will be that a text field will consist of a rectangle filled with white, whereas a push button consists of a rectangle filled with gray. In addition, text fields have more stringent rules regarding their contents. Specifically, a text field may contain a single text object, or be empty, but it may not contain anything else.

Further information regarding these controls is maintained by the present invention in case the client application requests it. For some AUTs, the text field may be completely determined, including text outside the text field's rectangle, by preserving text that was clipped when drawn. Some AUTs clip before drawing, in which case this information is unavailable. Similarly, the portion of the text that is "selected" (highlighted) can usually be determined. Most applications draw the highlighted text by drawing the text field's contents, then inverting the highlighted region (usually by drawing a rectangle over the highlighted region in such a way that it inverts what was already drawn, rather than erasing it). This information is associated with text objects during information gathering. The insertion point in a text field can be obtained if the text field is currently active (that is, if it is where characters typed at the AUT will be inserted), because the AUT will cause a caret (usually a blinking vertical bar) to be drawn at the insertion point by the operating system.

For page lists and push buttons, it can also be determined whether the control has the focus (when a push button has focus, a carriage return typed by the user has the same effect as clicking the push button with the mouse), and in the case of the page list, which tab has focus can also be determined. Only one control may have focus at a time. If the AUT wants to indicate that a rendered control has focus, it will draw a rectangle constructed from dotted lines inside the control's bounding rectangle. Such rectangles are typically ignored when constructing these controls. If only one such rectangle exists in the container window, and if it is contained in a rendered control, then it can be reported that the containing control has the focus.

Tables

One of the most complicated rendered controls is a table. There are several forms of tables, depending on the nature of the AUT and on the nature of the document being displayed. Generally, an application that is displaying data obtained from a relational database will display tables that are grids where all the rows look the same, and each consists of a series of controls (rather than just text)-text fields, check boxes, and so on. An application such as a Web browser, on the other hand, may display tables where the rows are not all the same, where there are no lines between rows or between columns, and where most of the table consists of text rather than controls. The present invention attempts to construct both "text tables" (where the table cells do not have borders) and "cell tables" (where they do) more or less in parallel by passing over the set of objects constructed by the previous grouping rules, and building as many possible tables of either type.

For cell tables, the process begins by constructing a list of all possible cells, i.e., rectangles that, generally speaking, do not contain other rectangles, and native controls, which define a rectangle by virtue of occupying a window. For cells defined by a rectangle, the process continues by finding all objects contained in the rectangle, i.e., all objects whose containing rectangle is entirely within the cell's rectangle, and links these objects to the cell. Thus, simple text objects and images, as well as rendered controls already identified by the grouping rules, can be linked into cells.

For some applications, the process continues by making a separate pass over the objects to adjust the vertical size and position of the cells already created. The main table-grouping algorithm must operate with fairly small tolerances although two controls of different types may have very different vertical extents. For example, a check box does not require as much vertical space as a text field. For this pass, objects are sorted by their vertical position, and then left-to-right for objects with the same vertical position. A list of all scroll bars in the window being grouped is obtained. A scroll bar that applies to a table will be on one of the table's edges, rather than in the middle of the table, so there is no need to adjust cells that are on opposite sides of a scroll bar to match each other.

Figure 7:
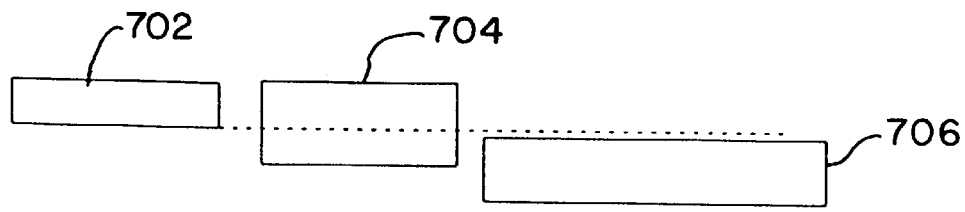
FIG. 7 is an illustration of a row of objects.

The cells are then divided into "lines," based on vertical position and position relative to any vertical scroll bars encountered. Two cells whose vertical extents completely overlap the vertical extent of a scroll bar, and that are on the same side of it, can be in the same line, as can two cells that do not completely overlap a scroll bar. The line breaks when the top of the next cell is below the bottom of the cell with the highest bottom, as shown in FIG. 7. Referring now to FIG. 7, although the rightmost cell 706 overlaps the center cell 704, it cannot be in a line with the leftmost cell 702. For each potential line, or row, an attempt is made to find a horizontal center line that will maximize the number of cells in the row. It is generally not required that all the cells in a row be center-aligned vertically, however, it is required that they be close to being center-aligned. This rule is based on observation and design principles. Specifically, two controls that are actually on the same row of a table will tend to be center-aligned if they differ substantially in height. If, for a given row, two or more cells can be included, then all the cells in the row are adjusted to have the same top (matching the top of the leftmost cell whose center led to the greatest row size) and bottom (the greatest vertical position of the bottoms of the cells on the row). This greatly simplifies the remainder of the cell table grouping algorithm, particularly since this adjustment is not needed for all AUTs.

Next, links are created for all objects in the container window, whether or not they are cells. Each object can have a "below link" which points to the object that will be the next cell in the same column if a table is constructed, and a "right link" which points to the object that will be the next cell in the same row. Links are not created between cells and non-cells. This is because generally tables do not as a rule have some sections where each cell has a border, and other sections where they do not. For cells, the below link is set if the object linked to is below, and overlaps in horizontal extent, the object linked from. If several objects meet this condition, the one whose horizontal overlap is the greatest is chosen, and the other cells that also overlap vertically are eliminated. Some applications draw tables such that one cell's lower-right corner might overlap slightly with the upper-left corner of the cell one column to the right, and one column down. However, such cells cannot be considered as being in the same column. For non-cells, the below link is set to another non-cell that is aligned, on the left, on the right, or in the center. Setting the right link is similar, with the same precautions taken to avoid linking to a cell that only overlaps on the corner.

Figure 8:
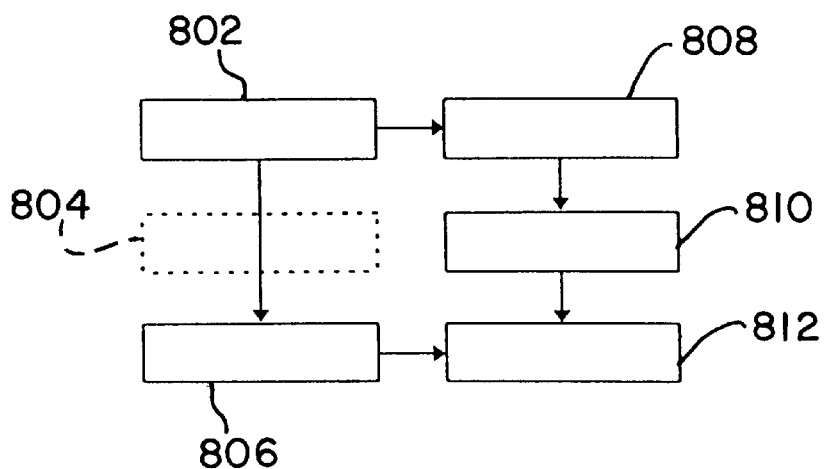
FIG. 8 is an illustration of a table with a missing cell.

It can occur that a table will not be fully populated. However, the method of the present invention is able to find gaps in the link structure, and fill them in, first for cells, then for non-cells. Referring now to FIG. 8, therein is shown a table 800 with missing cells. The table 800 would otherwise be an acceptable table were the missing cell in the second column provided. The present invention can determine that the cell is missing by examining the below links of the top row, and noticing that they do not all overlap in their vertical extents. The below link that is nearest the row under consideration is selected, and cells are filled in to complete the row, adjusting below and right links as necessary. In the table 800 shown in FIG. 8, the top-left cell 802 would be provided with a new below link to an empty cell 804, which would in turn be provided with a below link to the bottom-left cell 806. The new cell 804 would be provided with a right link to the middle cell 810 in the second column.

This approach will generally never lead to the filling in of a gap in the top row of a potential table. Usually the top row of a table contains labels for the columns, so it will be fully-populated. The left end may occasionally be missing, if the leftmost column of the table contains row numbers. This missing cell is filled in by noticing the case where the below link of the first cell in a row is the target of a right link, and the source of the right link and the target of the below link are top-aligned. In the table 800 of FIG. 8, if the top row (802, 808) were removed, the missing cell 804 would be filled in using this rule.

In filling in possible blanks in a cell table, the possibility that the table may not be a regular grid is generally not considered. This is because such a condition will be handled by the cell table grouping code. Similarly, when filling in gaps in a text table, basically the same algorithm is used; however, empty cells are not created when a non-cell object spans more than one column below it.

To this point, the steps taken in preparation for actually recognizing tables have been discussed. It should be noted that the method of the present invention is strongly disposed to find tables. Tables are a very common way of presenting information, and the present invention is much more likely to fail to recognize a table than it is to recognize as a table a grouping of information that is not, or, in any event, that will not be recognized as a table by a user. The tolerances required for alignment within a table row are usually on the order of two pixels, about 0.7 mm on a typical computer display. Objects that are this close to being aligned will look aligned, and therefore will be treated as such by a human user of the AUT.

Having completed the preparations, the objects in the current container window are examined, in order to determine where a table starts. If the object is a cell, then it may only start a cell table. Otherwise, it may only start a text table. For cell tables, a "cell column object" is defined, i.e., a cell that could be the first element of a table column, as a cell that has a below link. No cell that is not a cell column object can start a cell table. If the cell is a cell column object, the next step is to look for cells that are top-aligned with it, to its right, and that are also valid column objects. These will make up the first row of the table under construction. If a non-cell is encountered, this generally indicates the end of a row. Because a table must have a minimum number of columns, if the first row is too short, no table will be constructed.

Figure 9:
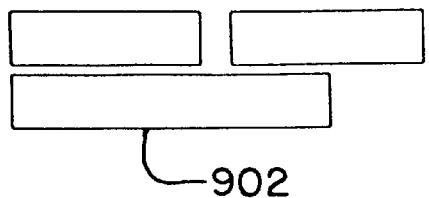
FIG. 9 is an illustration of an invalid spanning cell.
Figure 10:
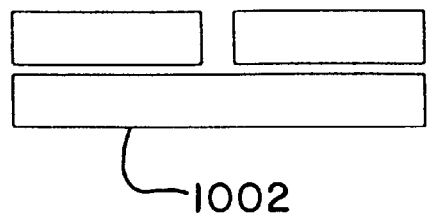
FIG. 10 is an illustration of a valid spanning cell.

Once the first row is established, the next step is to look for a reasonable second row beneath it. Each member of the second row must be left-aligned with the corresponding member of the first row. If the respective members are properly left-aligned, then the right edges of the two cells are examined. If the respective members are not properly right-aligned, then one of the cells must span two or more columns, i.e., it must be right-aligned with a neighboring cell in the other row. This is referred to as an "invalid spanning cell" 902 and is illustrated in FIG. 9. Such a cell will cause a table being constructed to be rejected as a possible table. Conversely, a "valid spanning cell" (FIG. 10) is properly left and right aligned and is acceptable. If a "big cell" or "valid spanning cell" is discovered, it is split into two cells, each containing the same text. Finally, the two table rows are examined, and any cells in the second row that completely overlap with the first row are merged into the first row.

The procedures carried out thus far indicate how many columns are in the table. Additionally, it must be determined how many rows are in the table. It should be noted that the step of merging some cells from the second row into the first may result in an incomplete second row, however, there may still be a below link from the merged cell to complete the second row. The first row of the table is examined, and it is determined whether the process can advance to another row. The advancement to the next row may take place if each cell in the first row has a below link, the linked cell is not too far away, and the linked cell does not simultaneously span more than one row and more than one column. If these tests all pass, then for some applications it is decided whether the first row is a heading rather than a content row. The first row is a table heading if the first row contains text that is all bold, and the second row does not. Similarly, if the first row contains text that is all one color, the second row contains text that is all one color, and the two rows' colors are different, the first row is taken to be a heading. This information does not alter the recognition of the table, but does alter the information that is returned to the client.

For all subsequent rows, it must be determined whether or not the process can advance to another row, and whether the new row meets the alignment conditions already stated. If the new row does meet the alignment conditions, another row is added to the table. If the new row does not meet the alignment conditions, then a break is indicated. If the number of rows recognized is greater than a predetermined minimum set as a parameter for the AUT, it is reported that a cell table has been recognized. For the next phase of table grouping, the following information is thus already determined: the number of rows, the number of columns, whether the table has a heading, and the objects that make up the first row.

The next step in table recognition is common to both cell tables and text tables. Once the table contents are identified, the next step is to construct new objects, one for each column in the new table. The children of the column object are the cells it contains, one for each row. If the table has a heading, the objects making it up are not stored as children of their respective columns, but rather, are stored separately, so the number of rows reported for a table includes content but not heading. The rectangle covered by the column object is the union of the rectangles covered by its children and its heading. The columns will be grouped into a table object, which has as its children the column objects.

Two additional steps are required for some applications. The rules described so far would not recognize the table heading in the table shown in FIG. 1. In addition, for the table of FIG. 1, the table should have a scroll bar as a child, in addition to its columns, because the scroll bar in fact changes the displayed rows of the table. The process for finding the heading looks above the table for text objects that are sufficiently close, and roughly centered on the column. To find scroll bars, all scroll bar children of the container window are examined. If a scroll bar aligns, within tolerances, with the bottom of the table, and with the top of either the first row in the table or with its heading, it is associated with the table as another child.

The grouping of text tables is similar. The definition of a text column object is somewhat more restrictive than that for a cell column object. Specifically, a text column object may not be bulleted text or part of a numbered list, and may not end with a colon. Because the cells in a text table do not have clear boundaries, the elements in a row are required to be center-aligned, rather than top and bottom aligned. Finally, some of the objects rejected as text table cells may be used as row headings, which are not recognized for cell tables. Text to the left of the leftmost cell in a row will, if it is properly aligned vertically, be made into the first column where text ending with a colon or bulleted text is appropriate.

The result of the grouping performed by the present invention is an array of objects derived in some way from the drawing operations originally recorded. The array contains only top-level objects. A control that has been identified as part of a table can only be obtained by accessing first, the table, then the column containing the control. Once the grouping operation is complete, the method of the present invention copies the entire data structure produced, including the contents of the primitive objects produced during information gathering, to a separate memory area, and releases the read lock it held on the data structures used for information gathering. This allows the AUT to resume drawing to the screen. The copying of the grouping information means that it will not be corrupted by a subsequent drawing operation. Although the method of the present invention can easily determine that the grouped data is not entirely current i.e., it knows immediately when the AUT has modified the contents of the screen, it does not regroup until the client application requests it. This allows the client to obtain information regarding the logical structure of the display in several steps, without worrying about whether it is accessing the same logical structure in each step. It should be recalled that grouping will, by convention, only be requested when the AUT is in a quiet state, so this does not cause the method of the present invention to report seriously outdated data.

Data retrieval and object manipulation

One of the most complicated objects managed by the method of the present invention is a table which has two levels of descendants, columns and their cells. Therefore, any object may be addressed by identifying its containing window, the top-level object's index in the grouping array, and the column and row numbers if appropriate. However, the client application does not have direct access to the grouping array, so an interface is required which allows it to access the contents indirectly. The client may call the method of the present invention with a system window identifier (which need not be a container window), and a coordinate within that window. The method of the present invention will locate a container window that either matches or contains the system window, then examine its object array to determine whether any object it has constructed contains the specified point. It returns an object handle, which includes the system identifier for the container window, the object's type, size, and location, and the three indices required to access the object. The client can then use this handle to manipulate the object in other ways.

The client may also request a list of all the top-level objects in a particular container window. In this case, the method of the present invention will return a set of object handles, which the client application can use to obtain further information. It should be noted that the top-level object handle for a table will not include any information about its contained columns. However, the client will know that it is a table handle, and can request a list of the table's children (its columns), then a further list of a single column's children, if it needs to manipulate a particular table cell.

The method of the present invention supports a large set of operations on the objects it recognizes, depending on the type of the object, and the amount of information it was able to obtain during its information gathering phase.

While the invention has been particularly shown and described with reference to a preferred embodiment thereof, it will be understood by those skilled in the art that various changes in form and details may be made therein without departing from the spirit and scope of the invention.

We claim:

1. A method for recognizing graphical objects comprising the following steps:

obtaining a current display state from a graphical user interface operating system;

classifying displayed windows as canvas windows or control windows;

classifying control windows which are separate windows as native controls, otherwise classifying control windows which are part of a canvas window as rendered controls;

transforming a real window hierarchy which is used to create the displayed windows into a perceived window hierarchy corresponding to the visual display of the displayed windows;

identifying graphical objects in the perceived window hierarchy as graphical object primitives;

applying a series of rules to the graphical object primitives to characterize the graphical object primitives as logical objects based on visual characteristics of said graphical object primitives.

2. The method of claim 1, further comprising the step of updating the perceived window hierarchy as windows are created or destroyed.

3. The method of claim 1, wherein the perceived window hierarchy includes container windows and wherein each of said container windows is capable of including child windows.

4. The method of claim 1, further comprising the step of synchronizing access to data structures by blocking execution of a process thread if it requires access to a data structure already in use in another process thread.

5. The method of claim 1, further comprising the following steps:

grouping the graphical primitive objects in a window using an object grouping process thread in order to create virtual objects;

preventing an application under test from drawing while said object grouping is being performed, said preventing step comprising at least one of the following steps:

marking said object grouping process thread as time critical;

allowing said object grouping process thread to obtain a read lock on objects being grouped; and determining whether the application under test is in a ready condition.

6. The method of claim 5, further comprising the step of adding at least one new graphical primitive object to at least one window corresponding to at least one of text and line drawing operations in said window.

7. The method of claim 6, wherein said adding step comprises the step of recording the text and clipping rectangle for said text drawing operation.

8. The method of claim 5, further comprising the step of updating information concerning said graphical primitive objects to reflect modifications to said graphical primitive objects.

9. The method of claim 5, further comprising the step of updating information concerning said graphical primitive objects to reflect movement of said graphical primitive objects, said movement including at least one of the following types of movement:

copying an off-screen bitmap into a container window in said virtual window hierarchy to thereby simulate the drawing of objects corresponding to said bitmap directly in said container window;

moving a portion of said display and updating origin information concerning said moved portion; and moving a content window within its parent window.

10. The method of claim 5, wherein said graphical primitive objects include lines and text strings and said virtual objects include text fields and composite objects.

11. The method of claim 10, wherein said composite objects include tables.

12. The method of claim 5, wherein said object grouping process thread resides in between said application under test and said graphical user interface operating system such that requests from said application under test to said graphical user interface operating system are intercepted and analyzed by said object grouping process thread before being passed on from said object grouping process thread to said graphical user interface operating system.

13. The method of claim 5, further comprising the step of adding at least one new graphical primitive object to at least one window said new graphical primitive object including a hyperlink, and said adding step further comprising the steps of positioning a mouse cursor in the vicinity of said hyperlink and extracting status window information corresponding to said hyperlink.

14. The method of claim 5, wherein said grouping step includes the use of a set of parameterized rules applied to the graphical primitive objects.

15. The method of claim 14, wherein said rules are applied in a predetermined order.

16. The method of claim 14, wherein said rules are applied iteratively such that the object grouping is continually refined by the iterative application of said rules.

17. The method of claim 14, wherein a predetermined tolerance parameter is used in the application of said rules.

18. The method of claim 5, wherein said grouping step comprises the step of creating rectangles from lines.

19. The method of claim 18, wherein said lines include horizontal and vertical lines, and said step of creating rectangles further comprises the following steps:

sorting said lines by vertical position;

selecting a first vertical line;

selecting a first horizontal line having a left end which matches a top end of said selected first vertical line; and selecting a second vertical line having a top end which matches a right end of said selected first horizontal line, and having a bottom end which matches a bottom end of said selected first vertical line.

20. The method of claim 19, wherein said step of creating rectangles further comprises the following step:

selecting a second horizontal line which extends from the bottom end of said selected first vertical line to the bottom end of said selected second vertical line.

21. The method of claim 20, wherein said selected lines have colors, said colors being used to assign one of a raised and lowered attribute to said rectangle.

22. The method of claim 20, wherein said step of creating rectangles is repeated and a list is assembled of the rectangles constructed from individual lines.

23. The method of claim 22, wherein said list of constructed rectangles is merged with a list of drawn rectangles.

24. The method of claim 19, wherein said first vertical line, said second vertical line and said first horizontal line identify a three-sided page list control.

25. The method of claim 24, wherein a plurality of page list controls are grouped in accordance with the following steps:

the page list controls are sorted by the vertical position of a missing edge in each page list control;

the page list controls are sorted from left to right;

grouping two page list controls if at least one of the following conditions is met:
the two page list controls are bottom aligned;
the two page list controls are within a predetermined distance of each other; and
each of the page list controls is labelled with a single text object or a plurality of overlapping text objects used to create a three-dimensional effect.

26. The method of claim 5, wherein said grouping step comprises the step of merging adjacent images into a single object.

27. The method of claim 26, wherein said merging step merges two images having a same top and bottom edge, and wherein a right edge of one image matches a left edge of another image.

28. The method of claim 26, wherein said merging step merges two images having matching left and right edges, and wherein a bottom edge of one image matches a top edge of another image.

29. The method of claim 5, wherein said grouping step comprises the step of merging text objects into a single object.

30. The method of claim 29, wherein said step of merging text objects is repeated to merge a plurality of text objects into a single text object.

31. The method of claim 29, wherein said step of merging text objects further comprises the following step:

merging at least one of a list number and a bullet with a text string to produce a list object, wherein the text string meets at least one of the following conditions:

the text string is positioned within a predetermined distance to the right of said list number or bullet; and the text string is center aligned with said list number or bullet.

32. The method of claim 31, wherein said list objects are grouped into a list if they are within a predetermined distance of each other.

33. The method of claim 32, wherein said step of grouping list objects continues until at least one of the following conditions is met:

a non-list object is encountered;

a horizontal line is encountered; and a list object is encountered which begins to the left of the first list object in the group.

34. The method of claim 31, wherein said step of merging text objects includes the step of merging a text object ending with a colon with an adjacent text object, if at least one of the following conditions is met:

the text object is below the text object ending with the colon;

the text object is within a predetermined distance of the text object ending with a colon; and the text object is left aligned with the text object ending with a colon.

35. The method of claim 29, wherein said step of merging text objects further comprises the following step:

merging two objects which overlap vertically.

36. The method of claim 29, wherein said step of merging text objects further comprises the following step:

merging two text objects which are stacked, wherein a bottom of one text object is in the vicinity of a top of another text object, if the two text objects satisfy at least one of the following conditions:
the text objects are left aligned;
the text objects are right aligned; and
the text objects are center aligned.

37. The method of claim 36, wherein the step of merging two text objects is prevented if at least one of the following conditions is met:

a line is positioned between said objects;

said objects end with a colon; and only one object is in bold face type.

38. A method for recognizing graphical objects and grouping said graphical objects into a table having at least one row and at least one column, said method comprising the following steps:

identifying graphical objects as graphical object primitives;

grouping the graphical primitive objects in a window using an object grouping process thread in order to create virtual objects, said grouping step comprising the step of creating rectangles from lines;

constructing a list of cells in said window, wherein said cells comprise rectangles;

sorting said cells by their vertical position, and then left to right for cells with the same vertical position;

dividing said cells into rows based on the vertical positions of said cells, the cells on a given row having substantially similar vertical positions, said dividing step including the step of identifying a row break when the top of a cell being considered is below the bottom of a cell in the row having the highest bottom position; and creating links for at least one cell in the table, said links including a below link which points to the next cell in the same column, and a right link which points to the cell which is the next cell in the same row.

39. The method of claim 38, further comprising the step of associating a scroll bar in said window with said table, wherein said associated scroll bar is located at an edge of the table.

40. The method of claim 38, wherein the step of dividing cells into rows includes the additional steps of locating a horizontal center line which maximizes the number of cells in a row, and adjusting the cells in a row to have substantially the same top position corresponding to the top of the leftmost cell in the row, and adjusting the cells in a row to have substantially the same bottom position corresponding to the bottom-most position of the cells in the row.

41. The method of claim 38, further comprising the step of identifying gaps corresponding to missing cells in said table by examining the below links for at least one row of said table.

42. The method of claim 41, further comprising the steps of inserting an empty cell corresponding to each said identified gap, and adjusting the links of the remaining cells to reflect the insertion of each empty cell.

43. The method of claim 42, wherein said inserting step includes the insertion of an empty cell in a gap corresponding to the left-most position of the top row of said table, said left-most gap being identified by a below link of the first cell in a row which is a target of a right link and a source of the right link and the target of the below link are top aligned.

44. The method of claim 38, further comprising the step of identifying a starting cell for said table.

45. The method of claim 38, wherein said cells are arranged in columns wherein each cell in a column is substantially left aligned with other cells in the column and located on different rows of said table.

46. The method of claim 38, further comprising the following steps:
 identifying a spanning cell which is left aligned with a first cell on another row and which is right aligned with a second cell on the same other row; and
 splitting said spanning cell into two or more individual cells each containing the same information as the spanning cell.

47. The method of claim 38, further comprising the step of merging a first cell on a first row which substantially overlaps a second cell on a second row.

48. The method of claim 38, wherein the step of dividing cells into rows includes the step of identifying an end of a first row of said table and advancing to a second row of said table when at least the following condition is met:
 each cell in the first row has a below link to a cell which is within a predetermined distance.

49. The method of claim 48, further comprising the step of identifying the first row as a table heading if at least one of the following conditions is met:
 the first row contains text which is all in bold face type and the second row does not contain all bold face type text; and
 the first row contains text that is all of a first color and the second row contains text which is all of a second color and said first and second colors are different.

50. The method of claim 48, wherein an indication of a cell table is reported if the number of rows in the table exceeds a predetermined minimum number of rows.

51. The method of claim 48, wherein a column object is constructed corresponding to each column of the table, and wherein the cells of a column object are identified as children of the column object.

52. The method of claim 48, further comprising the following steps:
 identifying a table heading by examining text objects that are within a predetermined distance of the top of said table and substantially centered about said table;
 identifying a scroll bar associated with said table by selecting a scroll bar having a bottom which is substantially aligned with the bottom of said table, and a top which is substantially aligned with the heading or the first row of the table.

53. The method of claim 38, wherein said table is a cell table.

54. The method of claim 38, wherein said table is a text table.

55. The method of claim 54, wherein the elements in each row are substantially center aligned.

* * * * *

UNITED STATES PATENT AND TRADEMARK OFFICE
CERTIFICATE OF CORRECTION

PATENT NO. : 6,046,740
DATED : April 4, 2000
INVENTOR(S) : David C. Laroche and Timothy A. Anderson It is certified that error appears in the above-identified patent and that said Letters Patent is hereby corrected as shown below:

Title page,
Item [73] Assignee, change "Seque" to -- Segue --.

Signed and Sealed this

Twenty-third Day of October, 2001

Attest:

NICHOLAS P. GODICI
Attesting Officer     Acting Director of the United States Patent and Trademark Office